(12) United States Patent
Burns et al.

(10) Patent No.: US 6,630,964 B2
(45) Date of Patent: Oct. 7, 2003

(54) MULTI-STANDARD CHANNEL DECODER FOR REAL-TIME DIGITAL BROADCAST RECEPTION

(75) Inventors: Geoffrey Francis Burns, Ridgefield, CT (US); Krishnamurthy Vaidyanathan, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 430 days.

(21) Appl. No.: 09/752,943

(22) Filed: Dec. 28, 2000

(65) Prior Publication Data

US 2002/0085648 A1 Jul. 4, 2002

(51) Int. Cl.⁷ .............. H04N 3/27; H04N 5/50; H04N 7/12
(52) U.S. Cl. ........ 348/554; 348/388.1; 348/716; 348/718; 375/240.24
(58) Field of Search ............ 348/554, 555, 348/558, 726, 727, 728, 731, 735, 737, 388.1, 385.1, 389.1, 715, 716, 717, 718, 719, 720, 721; 375/240.1, 240.24, 240.25; 725/131, 139, 151; H04N 3/27, 7/12, 5/50

(56) References Cited

U.S. PATENT DOCUMENTS

| | | | |
|---|---|---|---|
| 5,046,080 A | | 9/1991 | Lee et al. |
| 5,178,575 A | * | 1/1993 | Koch ................. 446/397 |
| 5,471,592 A | | 11/1995 | Gove et al. |
| 5,477,199 A | * | 12/1995 | Montreuil ............ 332/103 |
| 5,502,512 A | * | 3/1996 | Toyoda et al. ........ 348/706 |
| 5,583,500 A | * | 12/1996 | Allen et al. .......... 341/107 |
| 5,646,687 A | * | 7/1997 | Botsford, III et al. .. 375/240.12 |
| 5,666,170 A | * | 9/1997 | Stewart .............. 348/726 |
| 5,685,005 A | | 11/1997 | Garde et al. |
| 5,717,471 A | * | 2/1998 | Stewart .............. 348/726 |
| 6,075,935 A | | 6/2000 | Ussery et al. |
| 6,118,499 A | * | 9/2000 | Fang ................. 348/726 |
| 6,144,327 A | * | 11/2000 | Distinti et al. ....... 341/126 |
| 6,320,627 B1 | * | 11/2001 | Scott et al. .......... 348/726 |
| 6,330,036 B1 | * | 12/2001 | Murakami et al. ..... 348/555 |
| 6,333,767 B1 | * | 12/2001 | Patel et al. .......... 348/725 |
| 6,542,203 B1 | * | 4/2003 | Shadwell et al. ...... 343/726 |
| 2002/0037058 A1 | * | 3/2002 | Birru ................ 375/340 |
| 2002/0087998 A1 | * | 7/2002 | Burns ................ 725/100 |
| 2003/0072370 A1 | * | 4/2003 | Girod et al. ......... 375/240.13 |

OTHER PUBLICATIONS

Eurpoean PCT International Search Report (Jun. 20, 2002, PCT/IB 01/02485).*

* cited by examiner

Primary Examiner—Michael H. Lee
Assistant Examiner—Brian Yenke
(74) Attorney, Agent, or Firm—Michael E. Belk

(57) ABSTRACT

A multi-standard channel decoder for real-time digital broadcast reception has a plurality of processors connected to a sample-based communication unit for sample-based processing and connected to a block-based communication unit for block-based processing. The channel decoder is able to use the same processors to channel decode sample-based transmissions such as 8-VSB broadcasts and block-based transmissions such as COFDM broadcasts.

5 Claims, 3 Drawing Sheets

MULTI-STANDARD CHANNEL DECODER FOR REAL-TIME DIGITAL BROADCAST RECEPTION

FIELD OF THE INVENTION

The invention is related to the field of receivers for digital transmissions and more specifically to receivers for encoded digital television signals based on multiple standards.

BACKGROUND OF THE INVENTION

Today, there are at least three media over which digital video is delivered to the home—cable, satellite and terrestrial. In each case, a video signal is channel encoded and modulated to convert the video data to a form suitable for transmission over the chosen medium. An inverse operation is performed at the receiver to retrieve the transmitted signal. The device which performs the demodulation and channel decoding is known as a channel decoder.

Since the characteristics of each medium are different, each has its own associated transmission standard. In addition, standards are different in different regions of the world. In the U.S., the standard for terrestrial transmission is trellis coded 8-level Vestigial Side-band (8-VSB) modulation prescribed by the Advanced Television Systems Committee (ATSC) and cable transmission will probably use the same standard. The 8-VSB standard for terrestrial broadcasting allows either QPSK or QAM to be used and cable broadcasting will probably use 256-QAM for HDTV. In Europe, the Digital Video Broadcasting (DVB) group prescribes three different standards DVB-S, DVB-C and DVB-T for satellite, cable and terrestrial broadcasting respectively. The modulation scheme used in Europe for these DVB standards is Coded Orthogonal Frequency Division Multiplexing (COFDM). For terrestrial broadcasting, Japan has adapted Bandwidth Segmented Transmission (BST) Orthogonal Frequency Division Multiplexing (OFDM) which is similar to COFDM. 8-VSB and COFDM are radically different transmission schemes.

8-VSB is essentially an 8-level amplitude modulation scheme with a suppressed lower side band. The synch byte of 188 byte MPEG packets is stripped off and the remaining 187 bytes are pseudo-randomized. A Reed-Solomon encoder encodes the 187 byte blocks into 207 byte blocks with forward error correction. A data interleaver reorders the bytes within a block. The trellis encoder converts each byte to four 8-level channel symbols. A MUX inserts a synch byte after each 824 symbols resulting in a block of 825 symbols. A pilot signal is inserted for use equalization in the receiver. The resulting information stream is used to modulate a carrier which is radio frequency (RF) up-converted to the desired frequency and transmitted.

Herein the term stream simply means an ordered sequence of samples. This definition of a stream deviates from that often used in the video decoding community where a stream is usually defined as an ordered sequence of packets. A packet is a structured data element containing at least several bytes of data, but a sample is at most a complex number.

In COFDM the synch bytes are stripped from MPEG packets which are randomized and provided as a stream of samples. The stream is formed into 204,188 byte blocks of error encoded information by a Reed-Solomon encoder. As an outer code, the information is convolutionally interleaved with a depth of 12. A punctuated convolutional code is used as an inner code at least for DVB-T and DVB-S. A block-based interleaver rearranges the information. The signal is mapped to quadrature phase keyed (QPK) modulation or a level (e.g. 8, 16, 32, 64 or 128 level) of quadrature amplitude modulation depending on the bit rate and ruggedness required for the system. Pilot signals are mixed with the information and the signal is framed. Then an Inverse fast Fourier transformer converts the result into either 1705 carriers (called 2K) or 6817 carriers (called 8K) with 24 bit complex samples. Cyclic prefixes and guard bands are then added. Then the signal is RF up-converted to the desired frequency and transmitted.

A major difference in the architecture of channel decoders for VSB and OFDM transmissions concerns the respective block sizes of information required for processing and the operations that are performed on the blocks. For VSB, there is only one carrier so that demodulation is fairly simple and may be performed on a symbol by symbol basis. The resulting blocks of information are only 207 bytes and after forward error correction the blocks are only 187 bytes. Thus, only relatively small amounts of data need to be moved between processors and stored in the processors for processing. On the other hand, OFDM uses 2K or 8K carriers with 24 bit samples and demodulation requires fast Fourier transforms of the 2K or 8K by 24 bit blocks and is quite complicated. The storage requirements are thus much larger and moving data as a stream between processors for each operation is no longer practical so that the processors need to share a memory.

Both the 8-VSB and the COFDM channel decoders first perform a sample rate conversion. In the 8-VSB channel decoder, an SQRC filter operates on the output of the sample rate converter to provide timing recovery information that is fed back for the sample rate conversion. In the COFDM receiver the guard bands are removed from the output of the sample rate converter and the resulting information is subjected to an FFT. Intermediate synchronization information extracted during the FFT, is fed back to the sample rate conversion and other information added to the output of the sample rate conversion prior to guard band removal. Then the output of the FFT is subjected to channel estimation which is used in channel correction of the output of the FFT.

Two common approaches to designing channel decoders are the so called hardware approach and the software approach. In the hardware approach, special purpose processors (SPPs) are provided to perform the functions required for the channel decoding, for example, Application Specific Integrated Circuits (ASICs) or Field modified Programmable Gate Arrays (FPGAs) may be provided. These special purpose processors are able to operate at very high speeds. They also minimize the amount of hardware required and minimize software programming development time.

In the so called software approach, digital signal processors (DSPs) are programmed to perform each required function. DSPs are similar to general purpose processors with some modifications for more efficient signal processing. Programmed DSPs do not operate as quickly as SPPs and occupy more space than SPPs. DSPs are essentially off-the-shelf designs, so they reduce hardware development costs. Generally, DSPs can be used to provide a more flexible solution that may be upgraded as standards change.

A digital signal processor and shared memory scheme with arbitration is disclosed in U.S. Pat. No. 5,685,005 to Garde. A method of generating special purpose processors for particular problems is disclosed in U.S. Pat. No. 6,075,935 to Ussery. Ussery also discloses respective memories shared between respective pairs of parallel processors. A multiprocessor system for video processing re-configurable for SIMD or MIMD processing and accessing shared memory through a crossbar switch is disclosed in U.S. Pat. No. 5,471,592 to Gove. Gove uses a master processor to control the processing including the connections of the crossbar switch to interconnect the processors and the memory. U.S. Pat. No. 5,046,080 to Lee discloses a videophone system with multiple pipelined DSPs each accessing two buses, a VME bus and a memory bus.

Those skilled in the art are also directed to U.S. patent application Ser. No. 09/639,149 filed Aug. 8, 2000 by Vaidyanathan et. al. which discloses a sample-based communications network.

The above citations are hereby incorporated herein in whole by reference.

SUMMARY OF THE INVENTION

In the invention herein, a channel decoder includes a multitude of channel decoding functional units. A first plurality of the functional units communicate through a sample-based communication unit for channel decoding streams of sample-based channel encoded signals such as an 8-VSB transmission. The first functional units receive a stream of samples from the sample-based communication unit, stores the samples in the functional unit, perform sample-based processing on the stored samples, and transmit a stream of processed samples back to the sample-based communications unit. The sample-based communications unit receives a stream of channel encoded samples from an input/output bus and provides the samples to one of the first functional units for initial processing. The processed samples are passed as a stream from that one functional unit to subsequent first functional units for further sample-based processing until the channel decoding is complete. Finally, the sample-based communications unit provides the channel decoded samples back to the input/output bus.

Herein, sample-based processes refers to the fact that only a few ordered samples (e.g. 1 to 3 samples) are involved in the processing in a functional unit as opposed to block-based processing in which access to hundreds or thousands of samples of information are required for processing. In sample-based processing, functional units operate on input samples as they are received and transmit output samples as the output samples are completed. In block-based processing, each functional unit exclusively operates on fully populated input blocks and provide fully populated output blocks at the end of their processing for exclusive use by a subsequent functional unit. Generally, the blocks are not transmitted between functional units, but instead exclusive use of the blocks is passed from functional unit to functional unit. When possible, the input block is used as the output block.

A second plurality of the functional units communicate through a block-based communication unit for channel decoding block-based communication signals such as a COFDM transmission. The second functional units each communicate with one or more memory blocks of an electronic memory through the block-based communication unit. Preferably, the memory blocks have a uniform size. They load the sample information from a memory block, process the information, and store the processed information in the same memory block or in another memory block of the electronic memory. The second functional unit continues to access the same memory block or blocks until the processing to be performed by that second functional unit is complete and then the memory block may be accessed by a subsequent second functional unit. The block-based communication unit receives a stream of samples from the input/output bus and stores the samples into a memory block until a complete information block is stored. Preferably, the stream of samples are initially loaded from the stream into one of the functional units known as an accumulator which determines when a block of information has been accumulated and stores the resulting block of information into one of the memory blocks. Then the memory block is accessed by subsequent second functional units one-at-a-time which further process the block of information until decoding is complete. Finally, a stream of the decoded samples are provided through the block-based communication unit to the input/output bus.

At least some of the functional units are members of both the first and second plurality, that is, they are connected to both the sample-based communication unit and the block-based communication unit for performing similar functions for each respective type of decoding. At least some of these duel connected functional units are capable of being re-configured. At the beginning of sample-based processing of a sample-based transmission, these reconfigurable functional units are configured for sample-based processing. Similarly, at the beginning of block-based processing of a block-based transmission, these reconfigurable functional units are configured for block-based processing.

The functional units include functional units that are different for performing different functions of the channel decoding. The different functional units may be digital signal processors that are programmed to perform different functions, but preferably, the functional units include special purpose processors that are optimized for performing different functions of the channel decoding at a high speed for real-time reception of the 8-VSB or COFDM transmissions. Preferably the optimization of the special purpose processors includes fixed differences, that is, the processors differ by more than the programs in their writable memory.

The channel decoder also includes a control unit for configuring the reconfigurable functional units at the beginning of the sample-based or block based processing. Preferably, the control unit is a digital signal processor connected to the sample-based communications unit and it also performs some of the processing for channel decoding at least the sample-based transmissions. This allows the control unit to communicate with the reconfigurable functional units to reconfigure the reconfigurable functional units, but preferably, the control unit and all the functional units are directly connected to the input/output bus, and the control unit communicates with the reconfigurable functional units through the input/output bus to configure the reconfigurable functional units. After the control unit provides the initial configuration, then control of the functional units becomes data driven. For sample-based processing the functional units are controlled by the reception of data, and for block-based processing the functional units are controlled by the reception of information from another functional unit such as a pointer to a memory block or a flag indicating that the previous functional unit has completed its processing of the next memory block to be processed by the controlled functional unit.

The block-based communication unit may be a single bus or a plurality of busses for simultaneous access by respective functional units to respective memory blocks. The block-based communication unit may be one or more time-multiplexed buses for sequential one-at-a-time access by functional units to respective memory blocks, but preferably, the block-based communications unit is a cross-bar switch for simultaneous access between multiple functional units and one or more corresponding memory blocks. Preferably, the block-based communication unit is reconfigurable, such as by writing information in control registers that specify the order in which the functional units will access the memory blocks. The control unit also configures the reconfigurable block-based communications unit at the beginning of block-based processing and thereafter during the block-based processing the block-based communication unit controls the connections between functional units and blocks of memory according to the initial configuration provided by the control unit. The memory blocks may include a physically separate RAM for each memory block, or multiple blocks in each of one or more RAMs, or portions of memory blocks striped across a plurality of different RAMs.

Preferably, the channel encoder is contained in a single integrated circuit chip which is mounted on a circuit board and interconnected with wire bond or flip chip connections to form a circuit board assembly. The circuit board assembly may be part of a set-top box or a television set.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENTS AND BEST MODE

Figure 1:
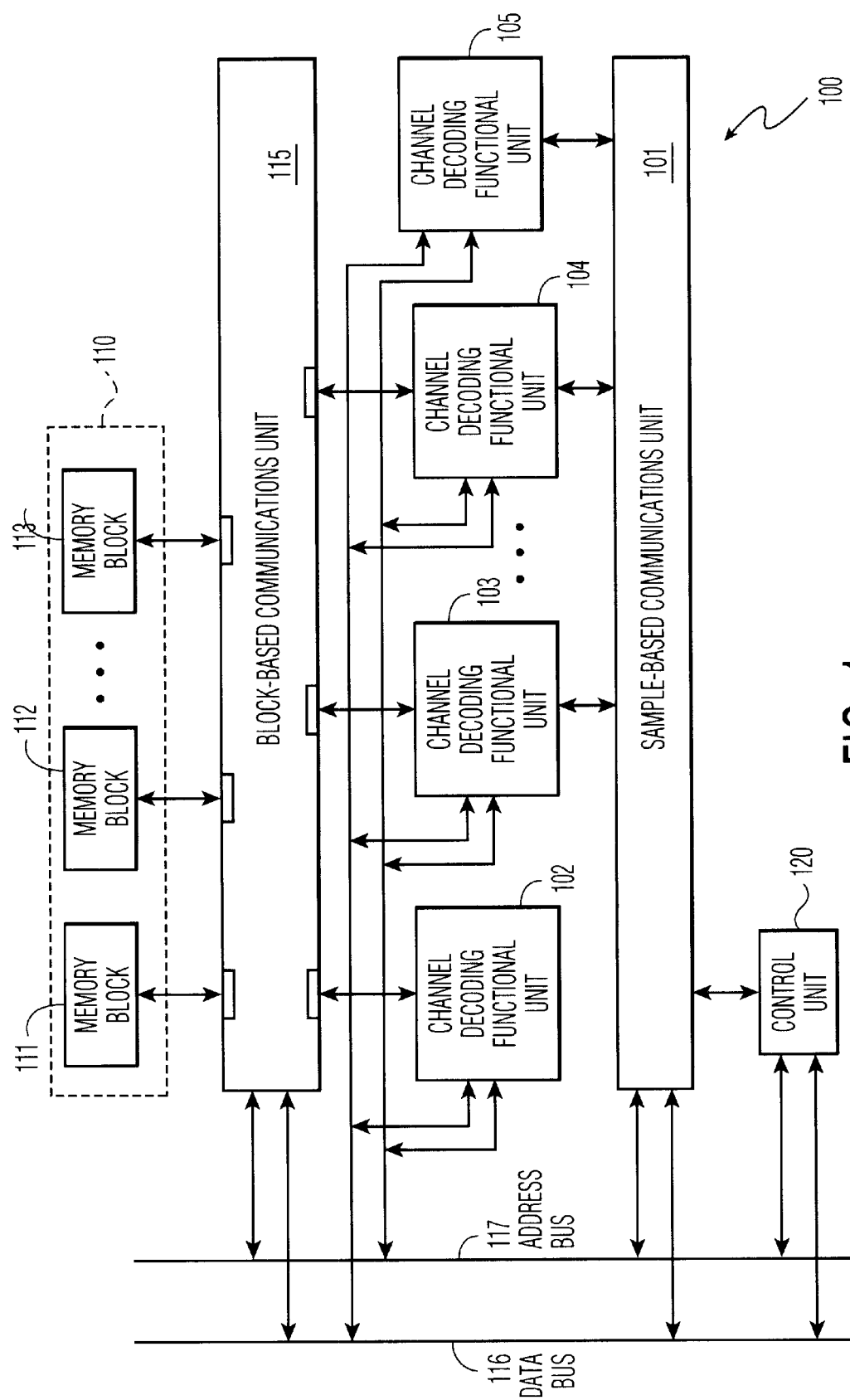
FIG. 1 illustrates a channel decoder of the invention.

FIG. 1 illustrates a channel decoder 100 of the invention. The channel decoder includes a sample-based communication unit 101 for transmitting streams of samples. The samples are atomic units of channel encoded communication signals, such as complex numbers. Herein, stream does not refer to an ordered sequence of packets (e.g. MPEG packets), but merely to an ordered sequence of samples.

Channel decoding functional units 102–105 perform different functions required for decoding of channel encoded communication signals. A first plurality 103–105 of the functional units are connected to the sample-based communications means to receive, process, and transmit streams of samples to the sample-based communications means, including streams of samples transmitted between the functional units through the sample-based communication unit. The functional units are reconfigurable for performing different related functions for decoding different types of channel encoded communication signals. The functional units are sub-processors of the channel decoder.

The functional units are different for performing their different functions. One or more of the functional units may be general purpose digital signal processors (DSPs) that are programmed differently to perform different functions of the channel decoding. More preferably, the different functional units have fixed differences that can not be reprogrammed so that some functional units can not perform the same functions as performed by other functional units. These fixed differences may be provided by different ASICs or different FPGAs that provide faster processing than can be provided by DSPs. The functional units are capable of block-based processing of coded orthogonal frequency division multiplexed (COFDM) transmission signals using either quadrature amplitude modulation (QAM) or quadrature phase-shift keyed (QPSK) modulation. The units are also capable of sample-based processing of trellis coded 8-level vestigial side-band modulation (8-VSB) transmission signals according to the Advance Television Systems Committee (ATSC) standard.

A shared electronic memory 110 includes a plurality of memory blocks 111, 112, 113 for storing respective information blocks of block-based channel signals to be decoded. The memory blocks may be respective physically separate RAMs. Alternatively, multiple memory blocks may be contained in each of one or more RAMs, or portions of memory blocks may be striped across a plurality of different RAMs.

A block-based communication unit 115 connects a second plurality of the functional units to different respective memory blocks of the electronic memory. The connections of the block-based communication unit, are changed during processing to connect at different times different functional units to the same memory block. The block-based communication unit stores information blocks from the functional units into the memory blocks and loads information from the memory blocks into the functional units as required for processing. The block-based communication means is reconfigurable by control signals transmitted through the input/output bus to control the connections between the functional units and the memory blocks. The configuration signals include values that are stored in configuration registers of the block-based communication means to control the connections between functional units and memory blocks.

The block-based communication unit may include a time-multiplexed bus, but more preferably includes a multi-path cross-bar signal switcher as described below with reference to FIG. 4. The connections between the functional units and the memory blocks are reconnected at regular predetermined intervals of time corresponding to the maximum time required for the functional units to process a block of information.

An input/output bus including a data bus 116 and an address bus 117. The input/output bus is connected to the sample-based communication unit to provide streams of channel encoded samples of sample-based transmissions from the data bus to the sample-based communication unit and to receive streams of channel decoded samples of a sample-based transmission from the sample-based communication unit into the data bus. The input/output bus is also connected to the block-based communication unit to provide information blocks of channel encoded communication signals of block-based transmissions from the data bus to the memory blocks of the electronic memory and to receive streams of decoded samples from the memory blocks to the data bus.

The addresses transmitted in the address bus control the connections between the data bus and other components of channel decoder including the sample-based communications unit and block-based communications unit.

Control unit 120 connected to the input/output bus for providing control signals for reconfiguring the functional units for processing of channel encoded transmission signals. The control unit is connected to the input/output bus which is connected to the functional units and the control unit may transmit the control signals to the functional units through the input/output bus. The control unit is also connected to the sample-based communication means and the control signals for reconfiguring the reconfigurable functional units may be transmitted from the control unit to the reconfigurable functional units through the sample-based communication means. The control signals result in values being stored in control registers. The control unit is a digital signal processor and performs some of the functions required in decoding at least the sample-based transmission signals.

Figure 2:
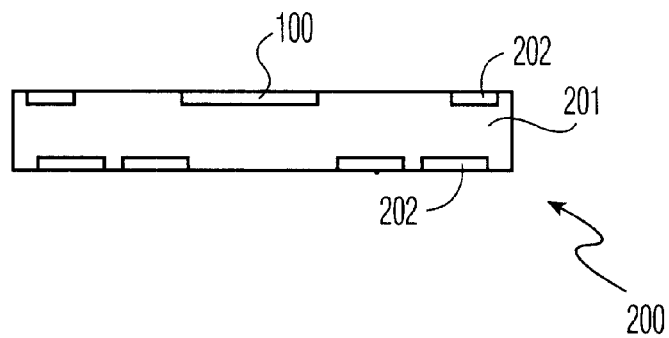
FIG. 2 shows a integrated circuit chip containing the channel decoder of FIG. 1.

FIG. 2 shows an integrated circuit chip 200 containing the channel decoder 100 of FIG. 1. The integrated circuit includes a substrate 201 of semiconductor material on which channel decoder 100 is provided. The chip also includes connection pads 202 for flip-chip and/or wire-bond connection to a circuit board.

Figure 3:
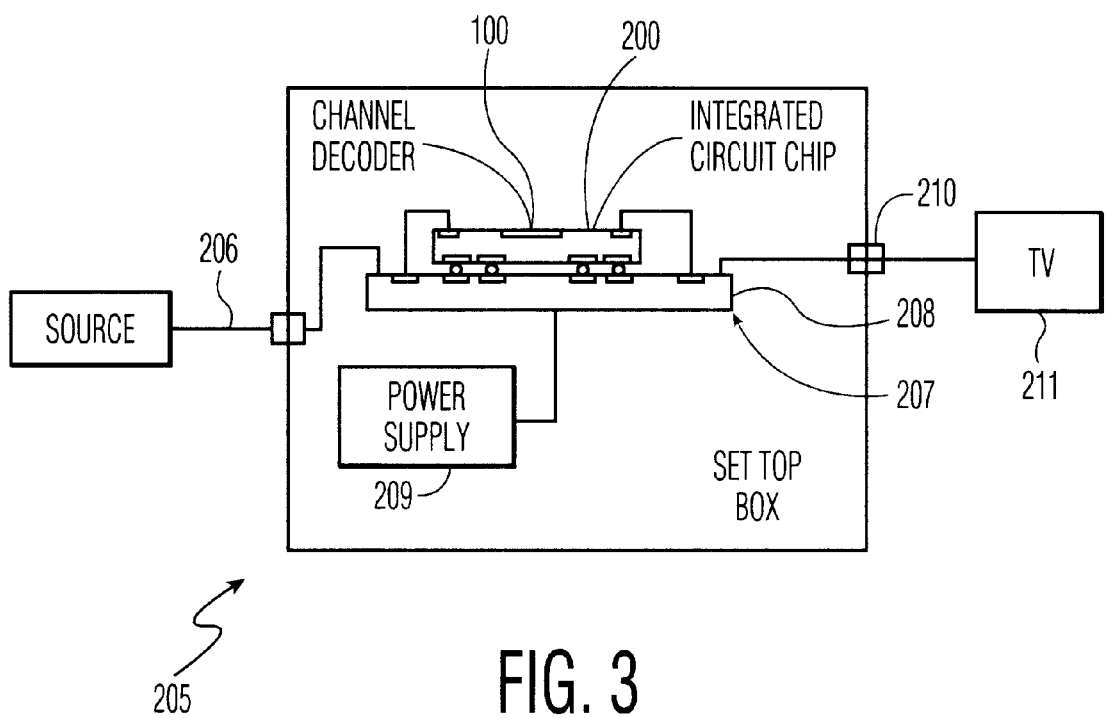
FIG. 3 illustrates a set-top-box with the integrated circuit chip of claim 2.

FIG. 3 illustrates set-top box 205 with the integrated circuit chip 200 of FIG. 2. The set-top box includes a connection 206 for receiving a channel encoded multimedia signal. One or more circuit board assemblies 207 include a circuit board substrate 208 connected to chip 200 using bond wires or flip-chip connections. Power supply 209 is connected to the circuit board assemblies to provide power to the circuit board assemblies. An output connection 210 provides for transmitting a channel decoded multimedia signal to a display 211

Figure 4:
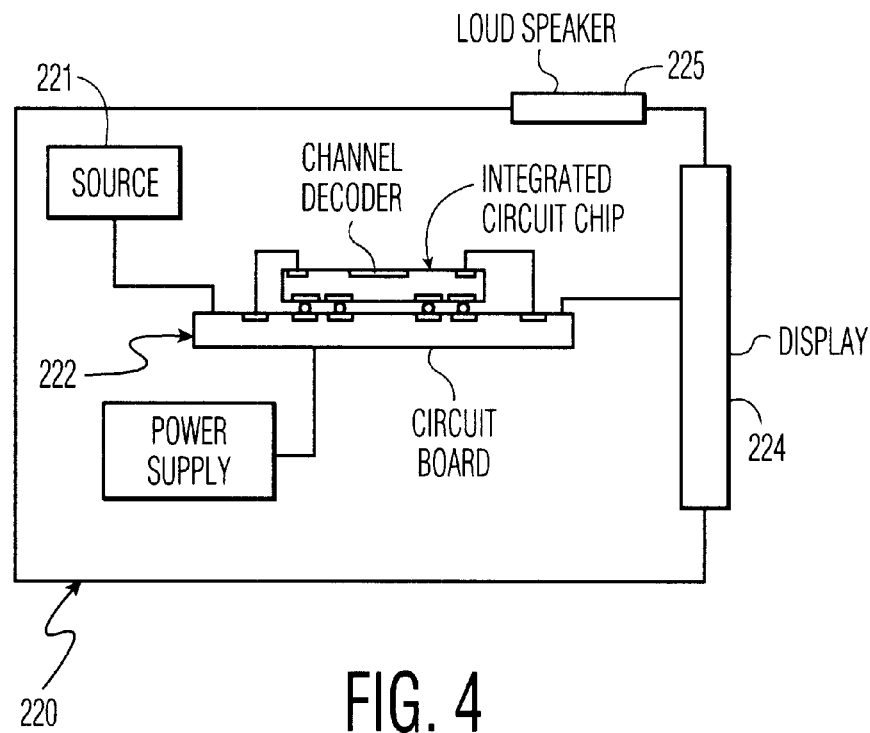
FIG. 4 illustrates a television with the integrated circuit chip of claim 2.

FIG. 4 shows a television set 220 of the invention including a source 221 for providing a channel encoded multimedia signal from a transmission media. One or more circuit board assemblies 222 are conected to power supply 223 to provide power to the circuit board assemblies. Display 224 is connected to the circuit board assemblies for presenting a video information of a decoded multimedia signal and load speaker 225 is connected to the circuit board assemblies for presenting an audio information of the decoded multimedia signal. Integrated circuit chip 200 of FIG. 2 is connected to one of the circuit board assemblies for decoding the channel encoded multimedia signal to provide the decoded multimedia signal.

Figure 5:
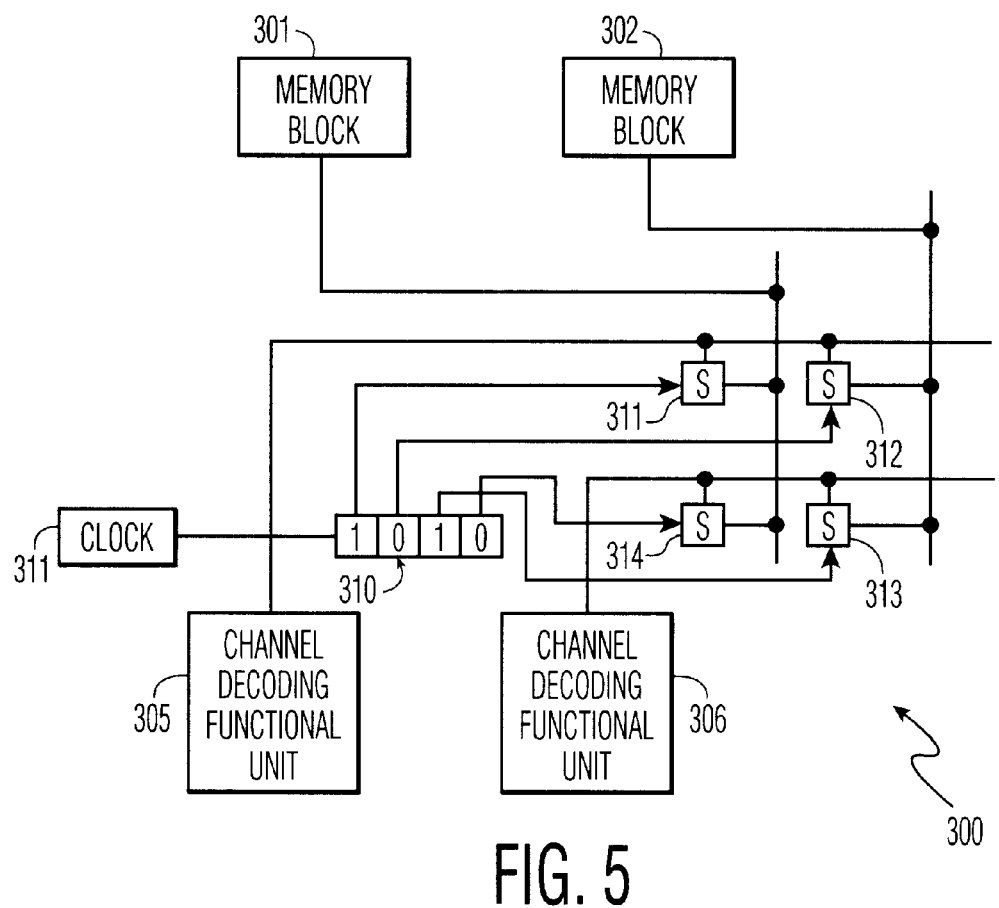
FIG. 5 shows an example of a configured cross-bar switch of the invention.

FIG. 5 illustrates a cross-bar type switcher 300 for reconnecting between memory blocks 301–302 and functional units 305–306. The connections are controlled by a configuration value stored in a circular configuration register 310. The bits of the register are connected to control switches 311–314. At the time shown, the value in register 310 is 1010 which activates switch 311 to connect functional unit 305 to memory block 301 and activates switch 313 to connect functional unit 306 to memory block 302. At predetermined intervals, the register receives a signal from clock 311 and the value in register 310 is circularly shifted. In this case when a clock pulse shifts the register the value in the register will become 0101, so that, switch 312 is activated to connect functional unit 305 to memory block 302 and switch 314 is activated to connect functional unit 306 to memory block 301. With this memory scheme no arbitration is required for functional unit access to memory blocks once the switcher is initially configured.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. A channel decoder, comprising:

sample-based communication means (101) for transmitting streams of samples, the samples being atomic units of channel encoded communication signals, the streams being ordered sequences of samples;

a multitude of channel decoding functional units (102, 103, 104) with decoding means for performing different functions for decoding of channel encoded communication signals, a plurality of the functional units being connected to the sample-based communications means to receive, process, and transmit streams of samples to the sample-based communications means, including streams of samples transmitted between the functional units through the sample-based communications means, the function performing means being reconfigurable for performing different related functions for decoding different types of channel encoded communication signals, the functional units being subprocessors of the channel decoder;

shared electronic memory means (110) including a plurality of memory blocks (111, 112, 113) for storing respective information blocks of block-based channel signals to be decoded;

block-based communication means (115) for connecting a plurality of the functional units to different respective memory blocks of the electronic memory, including connecting at different times different functional units to the same memory block, for storing information blocks from the functional units into the memory blocks and loading information from the memory blocks into the functional units;

an input/output bus including a data bus (116) and an address bus (117), the input/output bus connected to the sample-based communication means to provide a stream of channel encoded samples of sample-based transmission from the data bus to the sample-based communication means and for receiving a stream of channel decoded samples of a sample-based transmission from the sample-based communication means into the data bus, and connected to the block-based communication means to provide information blocks of channel encoded communication signals of a block-based transmission from the data bus to the memory blocks and to receive a stream of decoded samples from the memory blocks to the data bus, addresses on the address bus (117) controlling the connections between the data bus and the sample-based communications means and block-based communications means; and control means (120) connected to the input/output bus for providing control signals for reconfiguring the functional units for processing of channel encoded transmission signals.

2. The channel decoder of claim 1 in which:

the control unit is also connected to the sample-based communication means and the control signals for reconfiguring the reconfigurable functional units are transmitted from the control unit to the reconfigurable functional units through the sample-based communication means;

one or more of the functional units are general purpose digital signal processors (DSPs)

the block-based communication means is reconfigurable by control signals transmitted through the input/output bus to control the connections between the functional units and the memory blocks;

the configuration signals including values that are stored in configuration registers of the reconfigurable functional units and configuration registers of the block-based communication means;

the functional units including functional units that are different for performing different functions of the channel decoding;

the different functional units have fixed differences that can not be reprogrammed so that some functional units can not perform the same functions as performed by other functional units;

the decoding means block-based process coded orthogonal frequency division multiplexed (COFDM) transmission signals using either quadrature amplitude modulation (QAM) or quadrature phase-shift keyed (QPSK) modulation;

the decoding means sample-based process trellis coded 8-level vestigial side-band modulation (8-VSB) transmission signals according to the Advance Television Systems Committee (ATSC) standard;

the memory blocks are selected from one or more of: a respective physically separate RAM for each memory block, multiple memory blocks in each of one or more RAMs, or portions of memory blocks striped across a plurality of different RAMs;

the block-based communication means is selected from one or more of: a time-multiplexed bus; or a multi-path cross-bar signal switcher;

the connections between the functional units and the memory blocks are reconnected at regular predetermined intervals of time corresponding to the maximum time required for the functional units to process a block of information; and the controller unit includes a digital signal processor and in addition to configuring the functional units and the block-based communication means, the controller unit performs functions of the channel deconding of at least sample-based transmission signals.

3. An integrated circuit chip with the channel decoder of claim 1, comprising:

a substrate of semiconductor material;

connection pads for flip-chip and/or wire-bond connection to a circuit board; and the channel decoder of claim 1.

4. A set-top box with the integrated circuit chip of claim 3, comprising:

a connection for receiving a channel encoded multimedia signal;

one or more circuit board assemblies;

a power supply connected to the circuit boards to provide power to the circuit boards;

a connection for transmitting a channel decoded multimedia signal; and an integrated circuit of claim 3 connected to one of the circuit board assemblies for decoding the multimedia signal to provide the decoded multimedia signal.

5. A television with the integrated circuit chip of claim 3, comprising:

a source for providing a channel encoded multimedia signal from a transmission media;

one or more circuit board assemblies;

a power supply connected to the circuit board assemblies to provide power to the circuit board assemblies;

a display connected to the circuit board assemblies for presenting a video information of a decoded multimedia signal;

a load speaker connected to the circuit board assemblies for presenting an audio information of the decoded multimedia signal; and an integrated circuit of claim 3 connected to one of the circuit board assemblies for decoding the channel encoded multimedia signal to provide the decoded multimedia signal.

* * * * *